Figure 1:
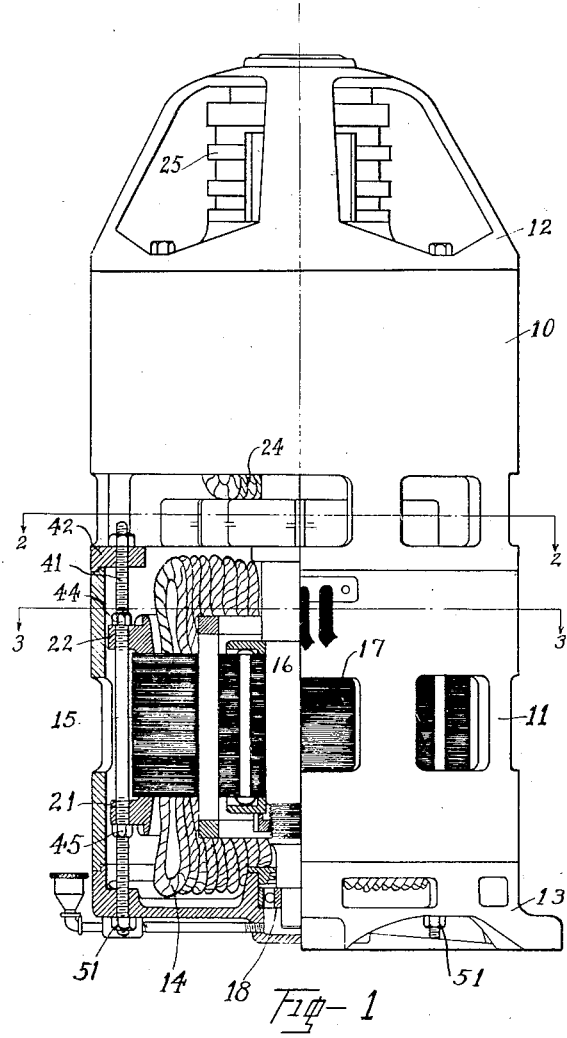

C. H. BUNCH.
MOTOR GENERATOR.
APPLICATION FILED MAR. 31, 1920.

1,405,965.

Patented Feb. 7, 1922.
2 SHEETS—SHEET 1.

Inventor
Charles H. Bunch,
By Baker & Macklin,
Attorneys

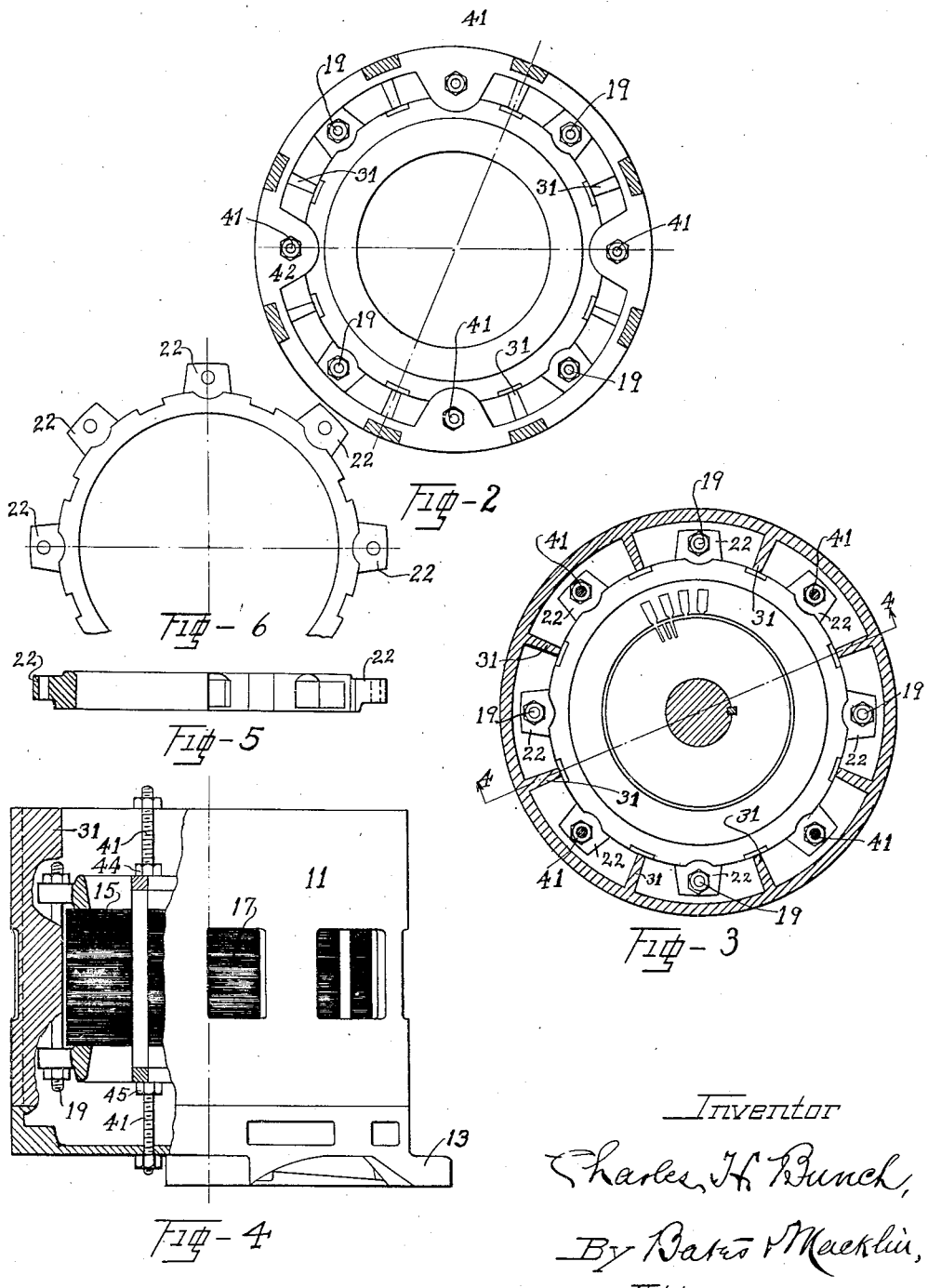

UNITED STATES PATENT OFFICE.

CHARLES H. BUNCH, OF CLEVELAND, OHIO, ASSIGNOR TO THE ACME ELECTRIC & MFG. CO., OF CLEVELAND, OHIO, A CORPORATION OF OHIO.

MOTOR GENERATOR.

1,405,965.  Specification of Letters Patent.  Patented Feb. 7, 1922.

Application filed March 31, 1920. Serial No. 370,265.

*To all whom it may concern:*

Be it known that I, CHARLES H. BUNCH, a citizen of the United States, residing at Cleveland, in the county of Cuyahoga and State of Ohio, have invented a certain new and useful Improvement in Motor Generators, of which the following is a full, clear, and exact description, reference being had to the accompanying drawings.

This invention relates to improvements in vertical motor generator sets, especially to the type adapted for low voltage use, such as charging batteries.

Heretofore the frame of a vertical motor generator set was made in two sections, the lower section being secured to the upper section by studs, which extended from the upper section to the lower part of the lower section. This method of assembly involved considerable time since the drilling and the tapping of holes was carried on under mechanical difficulties particularly such as inaccessibility of parts. In assembling the stator of the motor it was customary to insert the field laminations, one at a time into the frame, and then to force the entire set into a position where it could be locked by a plurality of keys. While they were thus held in position the desired phase winding was inserted in the laminations. It has been proven that this method of construction involves a considerable waste of time, and that the method of securing the laminations to the frame is not entirely practical. Frequently the lower armature bearing required adjustment, and to effect this it was necessary to remove the top of the frame, then the cap over the commutator and finally the shaft with the rotor secured thereto. This, of course, made the adjustment a difficult one inasmuch as a crane was required to lift the shaft out of the bearings.

An essential object of my invention is to provide means for enabling the stator of the motor to be wound independently of its position with respect to the frame, whereby the stator can be handled as a unit and inserted when desired into the frame. Another object is to construct the motor frame in such a manner that the lower bearing may be adjusted without removing the shaft.

I accomplish the above objects by cutting the lower section near the base and inserting the lower bearing for the shaft within the portion which in my construction constitutes the base of the motor generator set. I further provide end-rings which are positioned at each end of the stator laminations, and which are adapted to be drawn together by the application of a moderate degree of pressure.

I have illustrated convenient embodiments of my invention in the drawings herein. The method of accomplishing the above and other objects will become apparent in the following description which relates to the drawings. The essential characteristics are summarized in the claims.

In the drawings Fig. 1 is a side elevation partly in cross section of a vertical motor generator set; Fig. 2 is a section through the generator as shown on the line 2—2 in Fig. 1; Fig. 3 is a section through the motor as shown on the line 3—3 in Fig. 1; Fig. 4 is a side elevation partly in cross section of the motor frame showing the motor stator in position; Figs. 5 and 6 are details of the end rings used to hold the stator laminations together.

Describing the parts by the use of reference characters in Fig. 1, the frame, which houses the motor generator, comprises an upper section 10 secured to the lower section 11, a top 12 and a base 13. Within the frame and at the lower end thereof is the motor unit, while directly above it is the generator unit. Rigidly secured to the section 11 of the frame is the stator of the motor comprising the usual windings 14 in the laminations 15. Mounted within the frame is the shaft 16 which carries the rotor 17, of the motor, together with the armature 24 and a commutator 25 of the generator. The shaft 16 is supported by the bearing 18 in the base 13 and by another bearing at the top of the shaft in the cap 12.

My invention relates to the method of construction and manner of securing the stator of the motor to the frame. To assemble the stator I prefer to use a mandrel on which the laminations can be stacked, and at each end of the stack I place a ring as at 21 and 22. These rings, being preferably circular in form and concentric with the laminations as shown in Fig. 6, may then be urged toward each other to clamp the laminations by tightening the nuts 44 and 45 on the bolts 41. As shown in Figs. 5 and 6 the rings are provided with lugs 23 through which a plurality of bolts may be passed, preferably arranged so that half of the number of securing bolts serve to hold the end rings together, while the other half extend outwardly from both ends of the laminations and will serve to secure the stator to the frame. After the laminations are forced together and held in position by the rings, and before the unit is inserted in the frame, the stator may be wound for any phase winding or current desired, and then inserted in the section 11, and centered therein by a plurality of ribs 31 extending inwardly from the frame. As shown in Figs. 2 and 3, these ribs are preferably arranged so that one of the bolts, hereinbefore mentioned, may then be inserted between adjacent ribs. The inner faces of the ribs are machined to a size and closely embrace the outer periphery of the laminations as shown in Fig. 4. The bolts 41 which extend beyond both ends of the stator may be secured to lugs 42 in section 10 and at their lower ends to the base 13.

If a stator has been wound for a certain phase of current and inserted in a frame, then to change the winding so as to adapt the motor for a different type of current it is only necessary to remove the bolts which extend through the laminations and the base, then to slip the entire stator from its position and to insert another stator wound for the phase of current desired. It will be seen with such an arrangement, that by loosening the nuts of the bolts which secure the base to the lower section, that the base can be removed and the lower bearing made accessible for adjustment or repair, while the shaft is held in position by the upper bearing.

It will be seen from the foregoing description that I have provided a stator that can be completely finished and wound before placing it in the frame. This feature makes for cheapness in manufacturing costs. My invention permits of economy in supplying the requirements of a manufacturer, in that a comparatively large number of stators, embodying various phases and other electrical characteristics, may be kept for selecttion and use with any of a smaller number of frames. This is of commercial value inasmuch as the cost of a frame is greatly in excess of the cost of a stator.

I claim:

1. In a vertical motor generator set, the combination with a frame, of a motor stator comprising laminations, removable end rings positioned on each end of the stator, ribs extending longitudinally of the frame and abutting the outer periphery of the laminations, said ribs being out of contact with the end rings, two sets of bolts, one of said sets terminating adjacent the end rings, the other of said sets extending through the stator and connecting it with the frame, and all of said bolts being positioned intermediate the stator and the frame.

2. In a motor generator set, the combination with a frame comprising a housing for the generator, a housing for the motor and a base, radial ribs projecting inwardly from the motor housing, a motor stator comprising laminations and end rings, the laminations being in abutting engagement with the ribs, said rings having lugs projecting outwardly therefrom and positioned intermediate the laminations and the frame, two sets of bolts extending through the lugs, one of said sets being out of contact with the laminations and the frame, the other of said sets being out of contact with the laminations but connected with the frame.

3. In a motor generator set, the combination of a three-piece frame, comprising a generator housing, a motor housing and base, lugs projecting inwardly from the lower portion of the generator housing, separated ribs extending the entire length of the motor housing, a motor stator comprising laminations and end rings, the laminations being in abutting engagement with the ribs, end rings having lugs that extend outwardly beyond the laminations, there being one of said lugs intermediate a pair of adjacent ribs, two sets of bolts extending through said lugs and positioned alternately therethrough, one of said sets terminating adjacent the end rings, the other of said sets extending beyond the end rings and having the ends thereof connected with the lugs on the generator housing and the base respectively.

In testimony whereof, I hereunto affix my signature.

CHARLES H. BUNCH.